United States Patent [19]

Kirtland

[11] Patent Number: 5,738,260

[45] Date of Patent: Apr. 14, 1998

[54] WHEEL CHOCK STORAGE DEVICE

[76] Inventor: Kenneth P. Kirtland, 90 Los Cabos La., Ventura, Calif. 93001

[21] Appl. No.: 704,913

[22] Filed: Aug. 30, 1996

[51] Int. Cl.⁶ .................................................. B60R 9/06
[52] U.S. Cl. ............................ 224/515; 206/822; 224/512
[58] Field of Search .................................. 224/512, 514, 224/515, 534, 402; 280/769; 206/822, 527

[56] References Cited

U.S. PATENT DOCUMENTS

| | | | |
|---|---|---|---|
| 2,616,599 | 11/1952 | Hryhorczuk | 224/534 X |
| 2,631,806 | 3/1953 | Harder et al. | 224/515 X |
| 3,199,563 | 8/1965 | Forrest | 206/822 |
| 3,720,333 | 3/1973 | Vaughn | 224/402 X |
| 3,891,132 | 6/1975 | Chandler | 224/515 X |
| 5,236,342 | 8/1993 | Pellettier | 224/512 X |
| 5,620,125 | 4/1997 | Duncan et al. | 224/515 |

Primary Examiner—Renee S. Luebke

[57] ABSTRACT

A new Wheel Chock Storage Device for providing a device for storing a wheel chock on an automobile bumper. The inventive device includes a wheel chock storage container, a wheel chock retention strap, and a bumper attachment. The bumper attachment is attached to the wheel chock storage container and removably adjustably attaches the wheel chock storage container to the automobile bumper. An upper bumper attachment member is hookingly secured to the automobile bumper and an adjustable fastener is adjusted to secure the wheel chock storage container to the automobile bumper. The lower bumper attachment member is hookingly secured to the automobile bumper and a threaded tension knob is tightened to secure the wheel chock storage container to the automobile bumper. The wheel chock is placed in the wheel chock storage container and the retention strap securely retains the wheel chock in the wheel chock storage container.

10 Claims, 3 Drawing Sheets

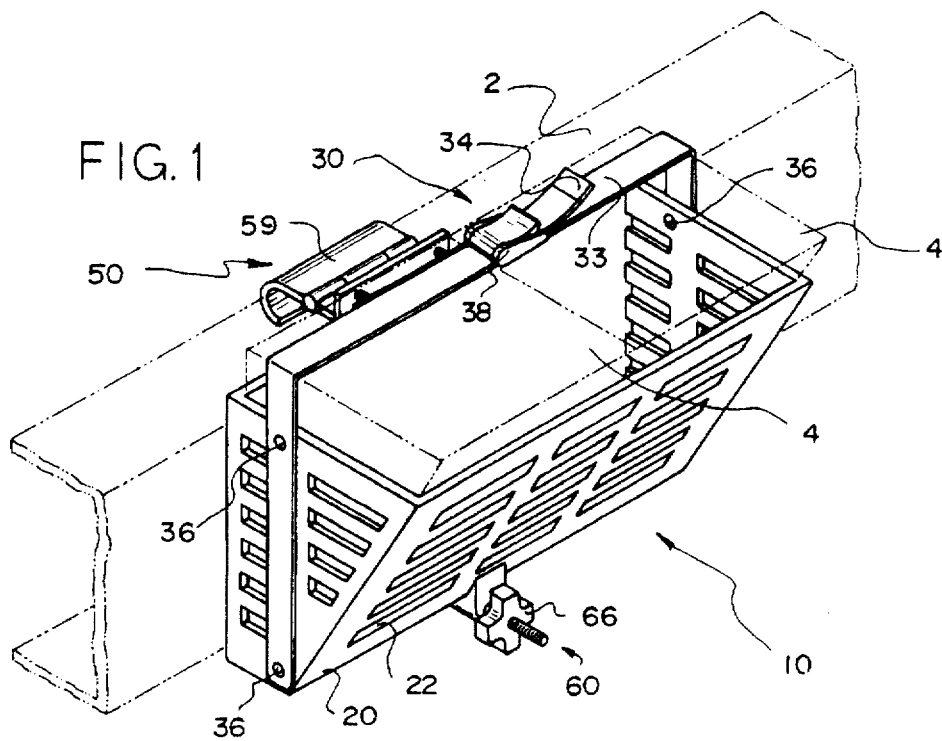
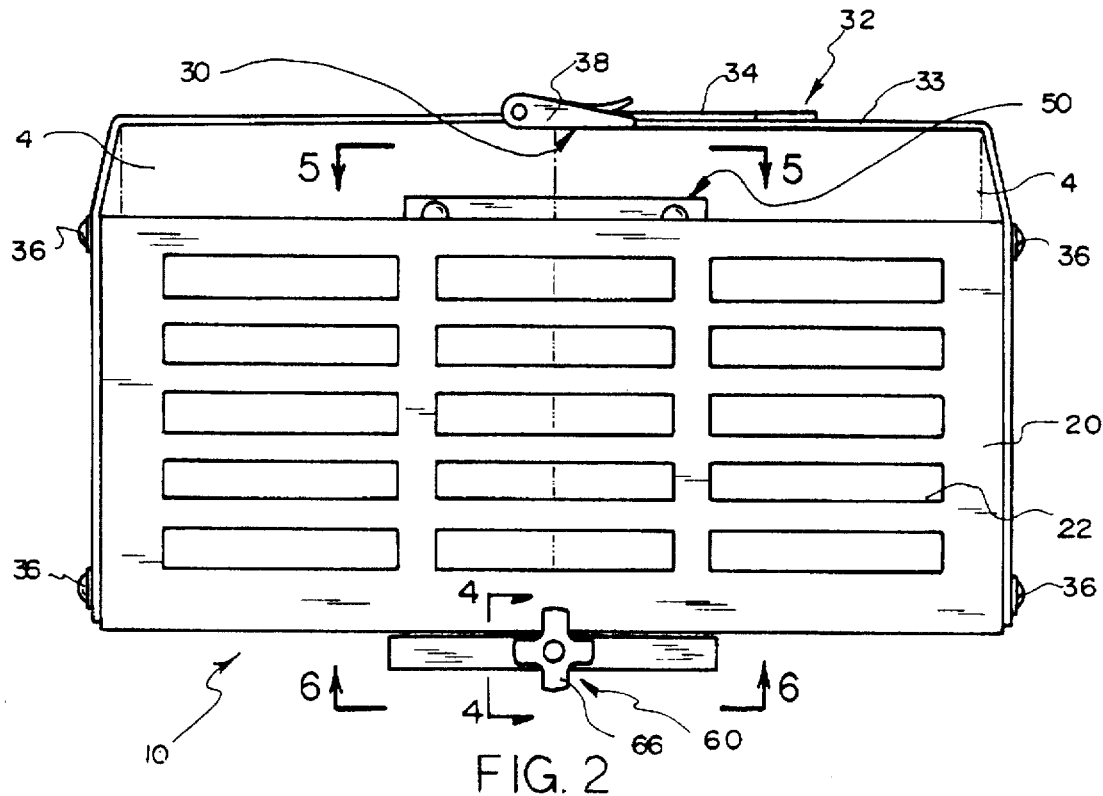

WHEEL CHOCK STORAGE DEVICE

BACKGROUND OF THE INVENTION

1. Field of the Invention

The present invention relates to wheel chock systems and more particularly pertains to a new Wheel Chock Storage Device for providing a means for storing a wheel chock on an automobile bumper.

2. Description of the Prior Art

The use of wheel chock systems is known in the prior art. More specifically, wheel chock systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art wheel chock systems include U.S. Pat. No. 5,104,170; U.S. Pat. No. 4,869,520; U.S. Pat. No. 5,364,142; U.S. Pat. No. 5,269,446; U.S. Pat. No. 5,421,625; and U.S. Pat. No. D283,022.

While these devices fulfill their respective, particular objectives and requirements, the aforementioned patents do not disclose a new Wheel Chock Storage Device. The inventive device includes a wheel chock storage container, a wheel chock retention means, and a bumper attachment means.

In these respects, the Wheel Chock Storage Device according to the present invention substantially departs from the conventional concepts and designs of the prior art, and in so doing provides an apparatus primarily developed for the purpose of providing a means for storing a wheel chock on an automobile bumper.

SUMMARY OF THE INVENTION

In view of the foregoing disadvantages inherent in the known types of wheel chock systems now present in the prior art, the present invention provides a new Wheel Chock Storage Device construction wherein the same can be utilized for providing a means for storing a wheel chock on an automobile bumper.

The general purpose of the present invention, which will be described subsequently in greater detail, is to provide a new Wheel Chock Storage Device apparatus and method which has many of the advantages of the wheel chock systems mentioned heretofore and many novel features that result in a new Wheel Chock Storage Device which is not anticipated, rendered obvious, suggested, or even implied by any of the prior art wheel chock systems, either alone or in any combination thereof.

To attain this, the present invention generally comprises a wheel chock storage container, a wheel chock retention means, and a bumper attachment means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Wheel Chock Storage Device apparatus and method which has many of the advantages of the wheel chock systems mentioned heretofore and many novel features that result in a new Wheel Chock Storage Device which is not anticipated, rendered obvious, suggested, or even implied by any of the prior art wheel chock systems, either alone or in any combination thereof.

It is another object of the present invention to provide a new Wheel Chock Storage Device which may be easily and efficiently manufactured and marketed.

It is a further object of the present invention to provide a new Wheel Chock Storage Device which is of a durable and reliable construction.

An even further object of the present invention is to provide a new Wheel Chock Storage Device which is susceptible of a low cost of manufacture with regard to both materials and labor, and which accordingly is then susceptible of low prices of sale to the consuming public, thereby making such Wheel Chock Storage Device economically available to the buying public.

Still yet another object of the present invention is to provide a new Wheel Chock Storage Device which provides in the apparatuses and methods of the prior art some of the advantages thereof, while simultaneously overcoming some of the disadvantages normally associated therewith.

Still another object of the present invention is to provide a new Wheel Chock Storage Device for providing a means for storing a wheel chock on an automobile bumper.

Yet another object of the present invention is to provide a new Wheel Chock Storage Device which includes a wheel chock storage container, a wheel chock retention means, and a bumper attachment means.

Still yet another object of the present invention is to provide a new Wheel Chock Storage Device that can be easily attached to various types of automobile bumpers.

Even still another object of the present invention is to provide a new Wheel Chock Storage Device that can be easily removed and either reattached to another automobile bumper or stored.

These together with other objects of the invention, along with the various features of novelty which characterize the

3 invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a new Wheel Chock Storage Device according to the present invention.

FIG. 2 is a front view of the present invention.

DESCRIPTION OF THE PREFERRED EMBODIMENT

Figure 3:
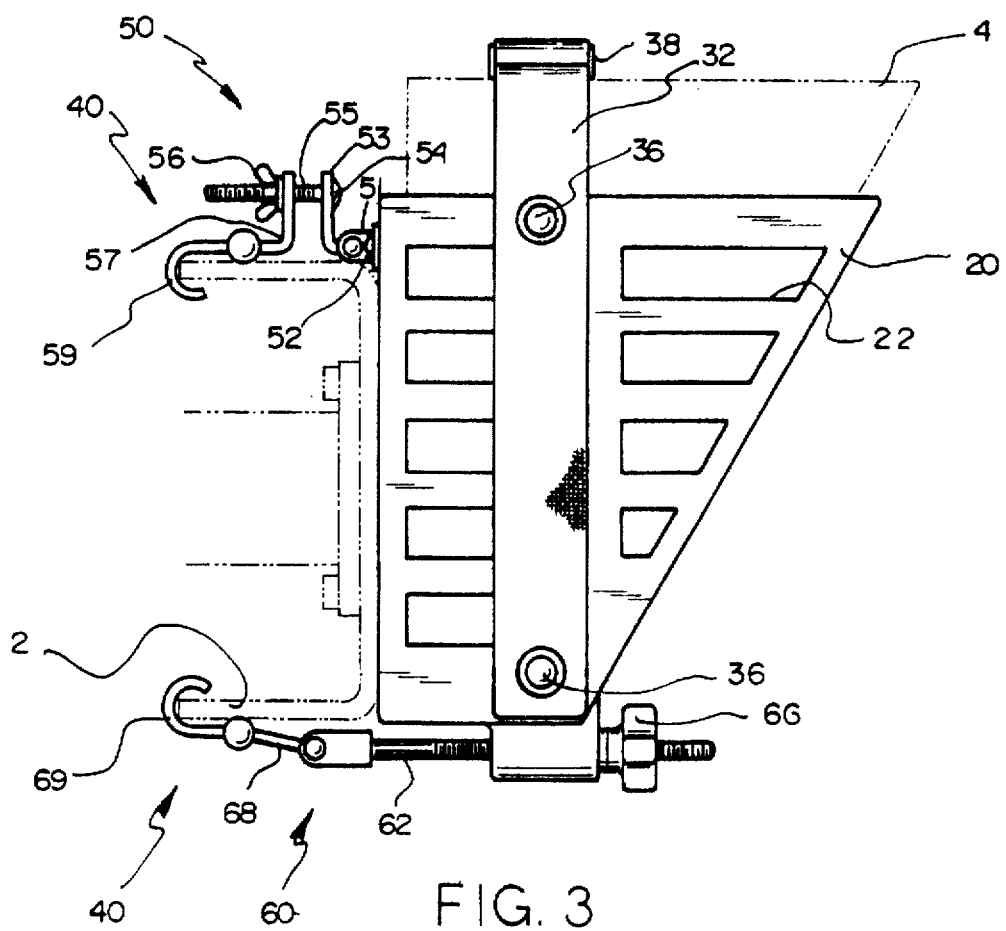
FIG. 3 is a left view of the present invention.
Figure 4:
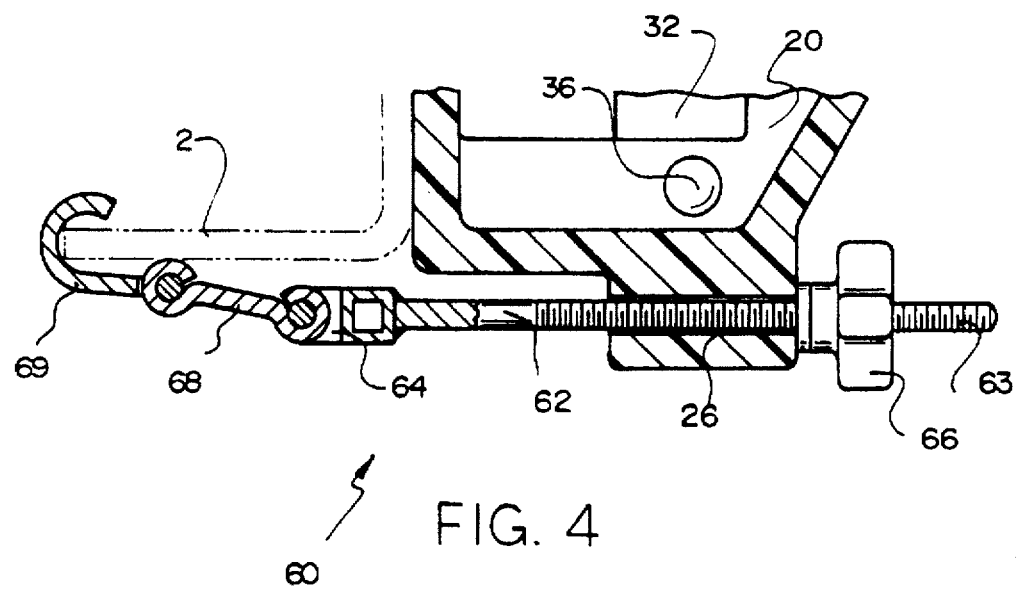
FIG. 4 cross sectional view of the lower attachment means taken along line 4—4 of FIG. 2.
Figure 5:
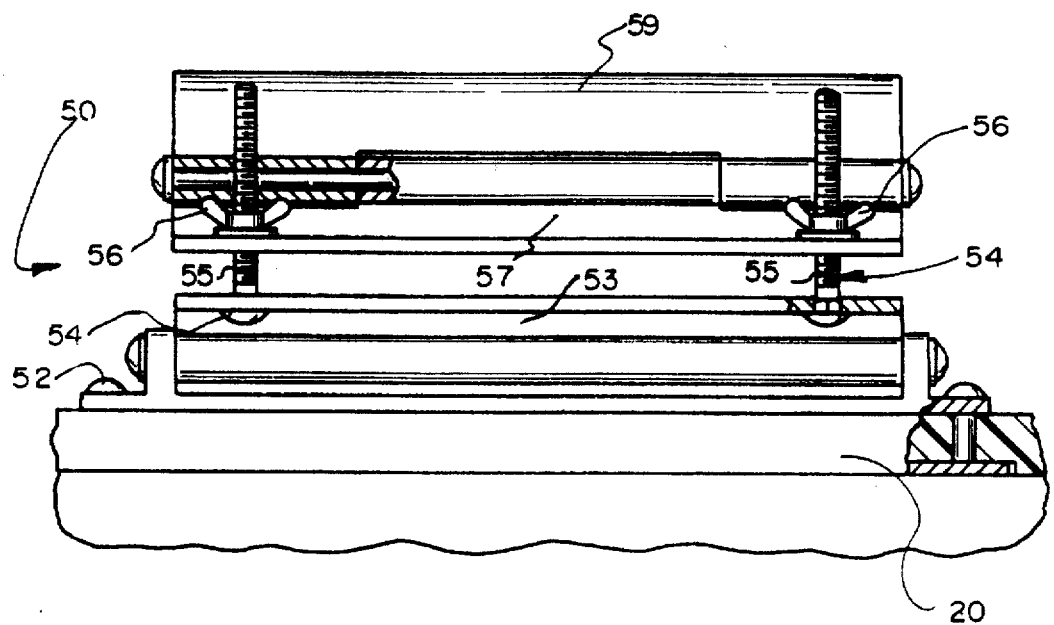
FIG. 5 is a top view of the upper attachment means from the perspective of line 5—5 of FIG. 2.
Figure 6:
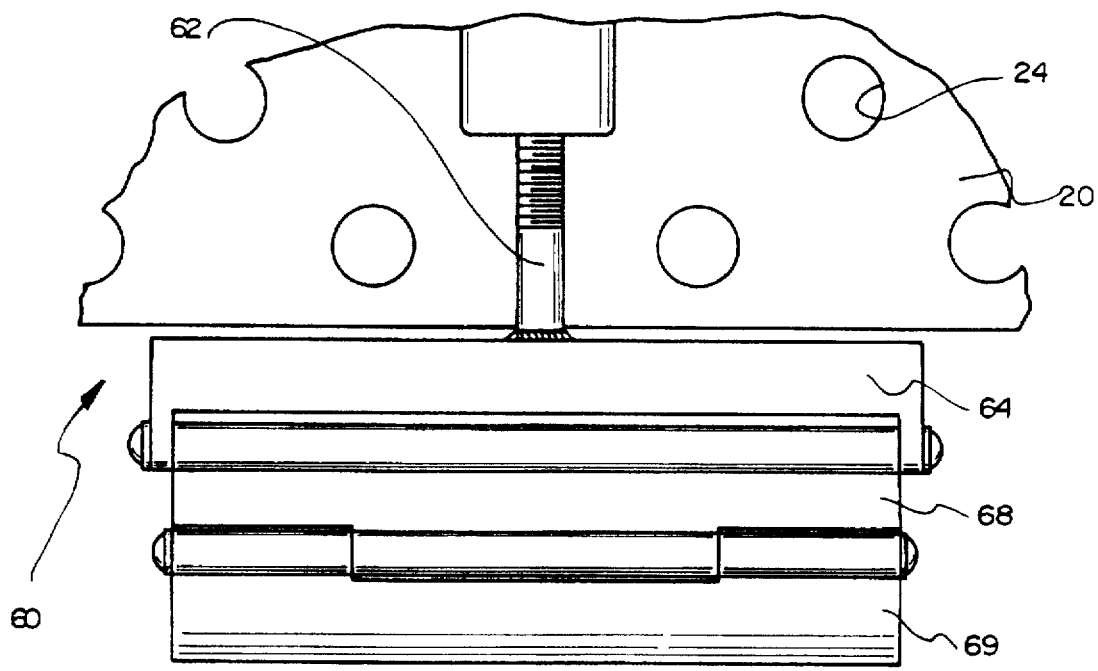
FIG. 6 is a bottom view of the lower attachment means from the perspective of line 6—6 of FIG. 2.

With reference now to the drawings, and in particular to FIGS. 1 through 6 thereof, a new Wheel Chock Storage Device embodying the principles and concepts of the present invention and generally designated by the reference numeral 10 will be described.

More specifically, it will be noted that the Wheel Chock Storage Device 10 comprises a wheel chock storage container 20, a wheel chock retention means 30, and a bumper attachment means 40. As best illustrated in FIGS. 1 through 3, the wheel chock retention means 30 securely retains a wheel chock 4 in the wheel chock storage container 20. The bumper attachment means 40 is attached to the wheel chock storage container and removably adjustably attaches the wheel chock storage container 20 to an automobile bumper 2. The wheel chock storage container 20 has an opening 22 for reducing the weight of the wheel chock storage container 20 and a drain hole 24 for allowing water to drain from the wheel chock storage container 20.

As best illustrated in FIGS. 1 through 3, the wheel chock retention means 30 further comprises a retention strap 32 having a fixed strap section 33 and an adjustable strap section 34, a strap fastener 36, and a strap tension buckle 38. The retention strap 32 is attached to the wheel chock storage container 20 by the strap fastener 36. The strap tension buckle 38 is attached to the fixed strap section 33 of the retention strap 32. The adjustable strap section 34 is inserted into the strap tension buckle 38 and adjusted to securely retain the wheel chock 4 in the wheel chock storage container 20.

As best illustrated in FIGS. 3 through 6, the bumper attachment means 40 further comprises an upper attachment means 50 and a lower attachment means 60. The upper attachment means 50 further comprises a container attachment member 51, an attachment member fastener 52, a first adjustment member 53, an adjustable fastener 54, a second adjustment member 57, and an upper bumper attachment member 59. The container attachment member 51 is attached to the wheel chock storage container 20 by the

4 attachment member fastener 52. The first adjustment member 53 is hingedly attached to the container attachment member 51. The second adjustment member 57 is adjustably attached to the first adjustment member 53 by the adjustable fastener 54. The adjustable fastener 54 comprises a carriage bolt 55 and a wing nut 56. The upper bumper attachment member 59 is hingedly attached to the second adjustment member 57 and hookingly secured to the automobile bumper 2.

The lower attachment means 60 further comprises an adjustable tension member 62 having a threaded end 63 and a coupling end 64, a threaded tension knob 66, a coupling member 68, and a lower bumper attachment member 69. The threaded end 63 of the adjustable tension member 62 is retained within a tension member retention bore 26 of the wheel chock storage container 20. The coupling member 68 is hingedly attached to the coupling end 64 of adjustable tension member 62. The lower bumper attachment member 69 is hingedly attached to the coupling member 68 and hookingly secured to the automobile bumper 2. The threaded tension knob 66 is threaded on the threaded end 63 of the adjustable tension member 62 and tightened to adjustably secure the wheel chock storage container 20 to the automobile bumper 2.

In use, the wheel chock storage container 20 is secured to the automobile bumper 2 by the bumper attachment means 40. The upper bumper attachment member 59 is hookingly secured to the automobile bumper 2 and the adjustable fastener 54 is adjusted to secure the wheel chock storage container 20 to the automobile bumper 2. The lower bumper attachment member 69 is hookingly secured to the automobile bumper 2 and the threaded tension knob 66 is tightened to secure the wheel chock storage container 20 to the automobile bumper 2. The wheel chock 4 is placed in the wheel chock storage container 20. The adjustable strap section 34 of the retention strap 32 is inserted into the strap tension buckle 38 and adjusted to securely retain the wheel chock 4 in the wheel chock storage container 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Wheel Chock Storage Device for storing a wheel chock having a wedge-shaped profile on an automobile bumper, comprising:

a wheel chock storage container adapted to receive said wheel chock, said wheel chock storage container having a top and a bottom, and including a bottom wall having a front edge, a back edge, and a pair of side edges, a pair of sidewalls extending upward from said pair of side edges of said bottom wall, a back wall extending upward from said back edge of said bottom wall, and a front wall extending upward from said front edge of said bottom wall and diverging from said back wall, wherein said wheel chock storage container is open at said top thereof, and wherein said wheel chock storage container generally conforms to said wedge-shaped profile of said wheel chock;

a wheel chock retention means for retaining said wheel chock in said wheel chock storage container; and a bumper attachment means for removably and adjustably attaching said wheel chock storage container to said automobile bumper, wherein said back wall of said wheel chock storage container abuts said automobile bumper.

2. The Wheel Chock Storage Device of claim 1, wherein said wheel chock retention means comprises:

a retention strap including a first strap section and a second strap section, one end of said first strap section attached to a first of said pair of sidewalls of said wheel chock storage container and one end of said second strap section attached to a second of said pair of sidewalls of said wheel chock storage container, wherein said retention strap extends between said pair of sidewalls of said wheel chock storage_ container along said top thereof; and a strap tension buckle, said strap tension buckle attached to a free end of said first strap section, wherein a free end of said second strap section is releasably and adjustably coupled to said strap tension buckle, whereby said second strap section is adjusted to securely retain said wheel chock in said wheel chock storage container.

3. The Wheel Chock Storage Device of claim 1, wherein said bumper attachment means comprises:

an upper attachment means coupled to said back wall of said wheel chock storage container adjacent said top thereof for removably and adjustably attaching said wheel chock storage container to an upper edge of said automobile bumper; and a lower attachment means coupled to said bottom wall of said wheel chock storage container for removably and adjustably attaching said wheel chock storage container to a lower edge of said automobile bumper.

4. The Wheel Chock Storage Device of claim 3, wherein said lower attachment means comprises:

an adjustable tension member having a threaded end and a coupling end, said threaded end adjustably coupled to said bottom wall of said wheel chock storage container;

a threaded tension knob, said threaded tension knob adjustably threadingly attached to said threaded end of said adjustable tension member;

a coupling member, said coupling member hingedly attached to said coupling end of said adjustable tension member; and a lower bumper attachment member, said lower bumper attachment member hingedly attached to said coupling member and hookingly secured to said lower edge of said automobile bumper.

5. The Wheel Chock Storage Device of claim 3, wherein said upper attachment means comprises:

a container attachment member, said container attachment member attached to said back wall of said wheel chock storage container;

an adjustable fastener;

a first adjustment member, said first adjustment member hingedly attached to said container attachment member;

a second adjustment member, said second adjustment member adjustably attached to said first adjustment member by said adjustable fastener; and an upper bumper attachment member, said upper bumper attachment member hingedly attached to said second adjustment member and hookingly secured to said upper edge of said automobile bumper.

6. The Wheel Chock Storage Device of claim 5, wherein said adjustable fastener comprises a carriage bolt and a wing nut adjustably threadingly secured to said carriage bolt.

7. A Wheel Chock Storage Device for storing a wheel chock having a wedge-shaped profile on an automobile bumper, comprising:

a wheel chock storage container adapted to receive said wheel chock, said wheel chock storage container having a top and a bottom, and including a bottom wall, a pair of sidewalls, a back wall, and a front wall all cooperatively joined together, wherein said wheel chock storage container is open at said top thereof, and wherein said front wall diverges from said back wall toward said top of said wheel chock storage container, whereby said wheel chock storage container generally conforms to said wedge-shaped profile of said wheel chock;

a retention strap for retaining said wheel chock in said wheel chock storage container, said retention strap including a first strap section having one end attached to a first of said pair of sidewalls of said wheel chock storage container, a second strap section having one end attached to a second of said pair of sidewalls of said wheel chock storage container, and a coupling means for joining a free end of said first strap section to a free end of said second strap section, wherein said retention strap extends between said pair of sidewalls of said wheel chock storage container along said top thereof; and a bumper attachment means for removably and adjustably attaching said wheel chock storage container to said automobile bumper, wherein said back wall of said wheel chock storage container abuts said automobile bumper.

8. The Wheel Chock Storage Device of claim 7, wherein said bumper attachment means comprises:

an upper attachment means for removably attaching said wheel chock storage container to an upper edge of said automobile bumper; and an adjustable lower attachment means for removably and adjustably attaching said wheel chock storage container to a lower edge of said automobile bumper.

9. The Wheel Chock Storage Device of claim 8, wherein said upper attachment means comprises:

an upper clamping member having a first end and a second end, said first end secured to said back wall of said wheel chock storage container adjacent said top thereof, said second end terminating in an inturned portion adapted for clamping to said upper edge of said automobile bumper.

10. The Wheel Chock Storage Device of claim 8, wherein said adjustable lower attachment means comprises:

an adjustable lower clamping member having a first end and a second end, said first end secured to said wheel chock storage container adjacent said bottom thereof, said second end terminating in an inturned portion adapted for clamping to said lower edge of said automobile bumper.

* * * * *